Patented Aug. 3, 1926.

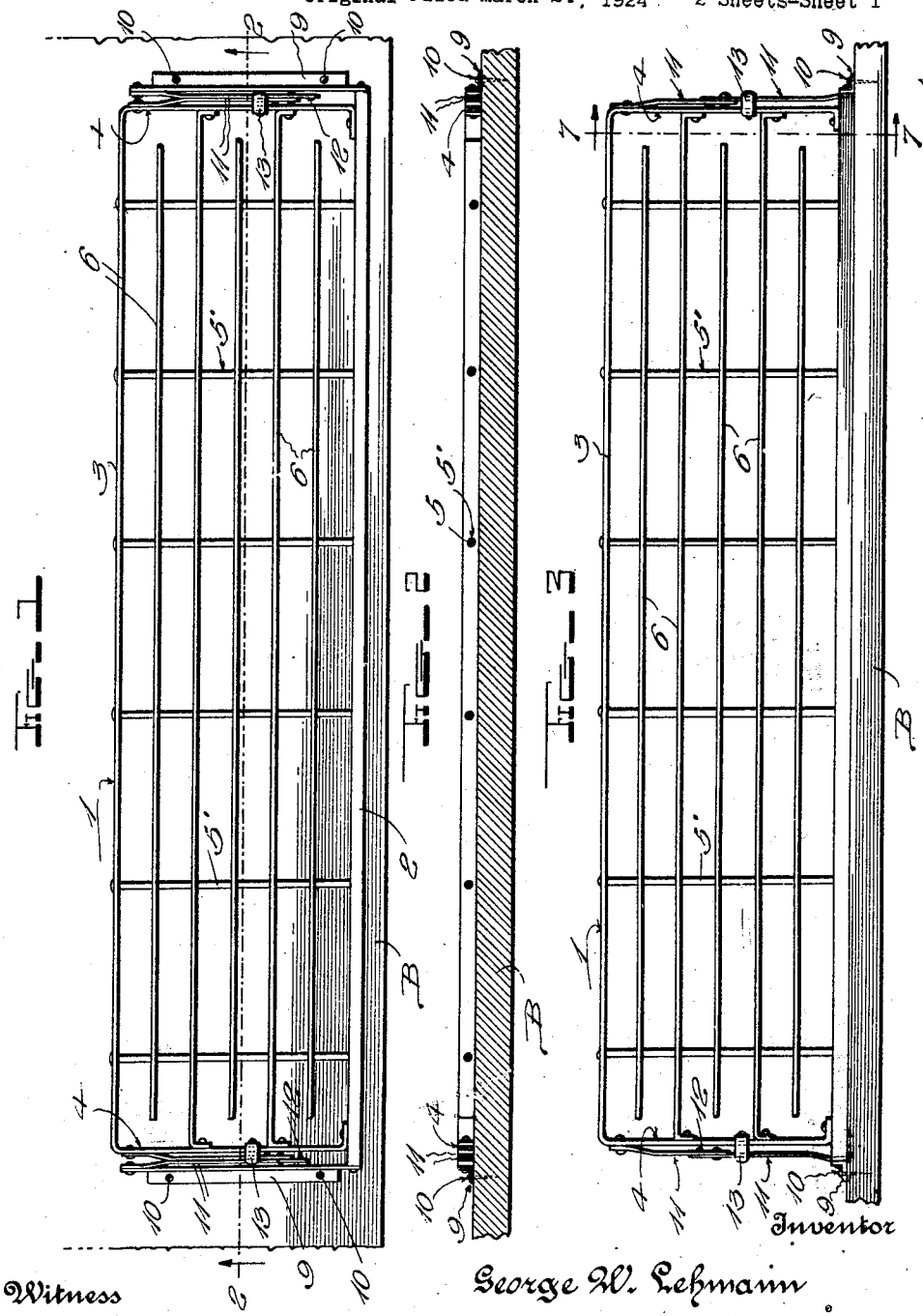

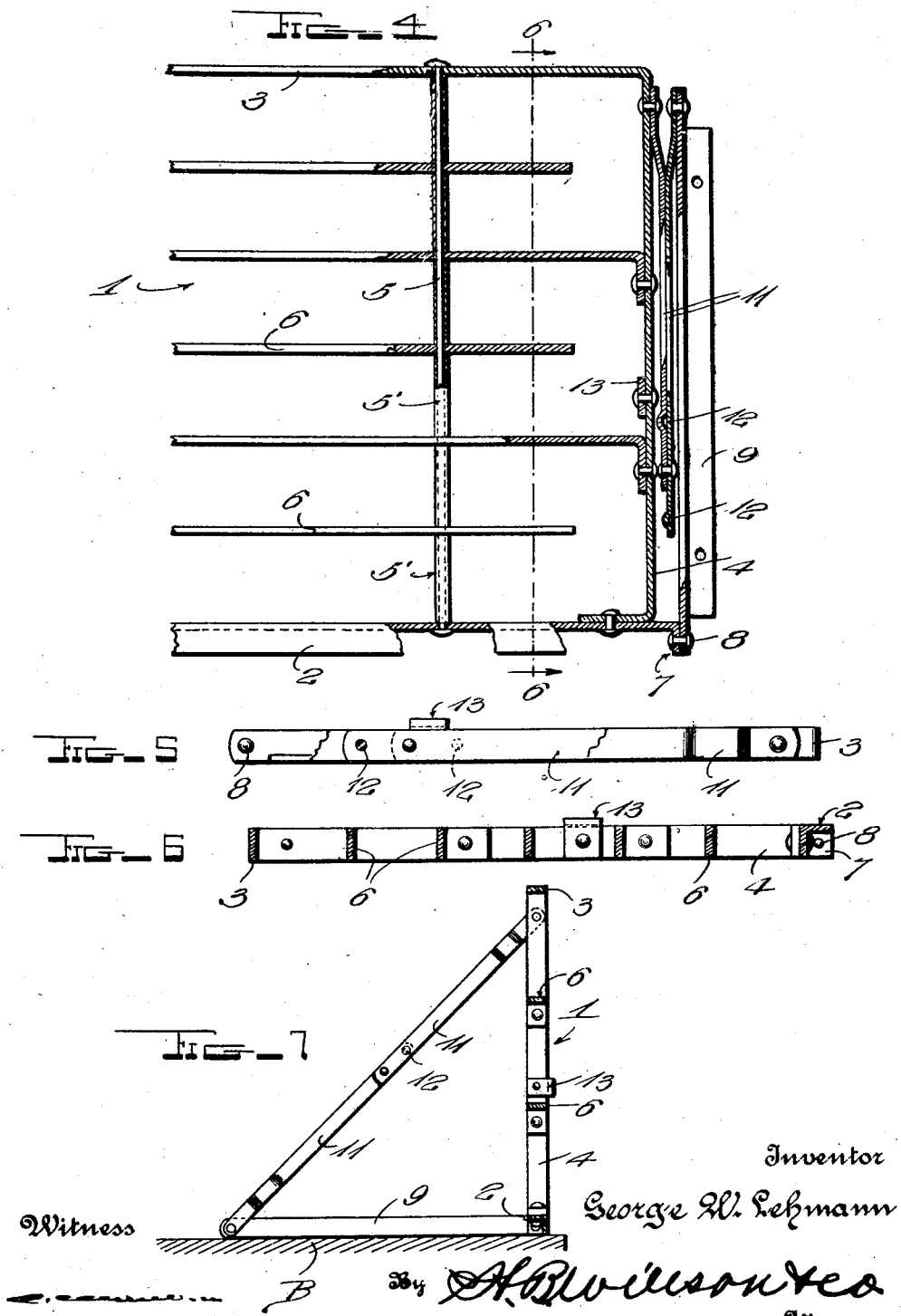

1,594,968

UNITED STATES PATENT OFFICE.

GEORGE W. LEHMANN, OF MAYWOOD, ILLINOIS.

COMBINATION FOOTBOARD MAT AND LUGGAGE CARRIER.

Application filed March 24, 1924, Serial No. 701,535. Renewed November 9, 1925.

This invention relates generally to automobile accessories and particularly to attachments which may be used as a footboard mat or scraper and as a luggage carrier.

The principal part of the device is a frame or rack which is fastened to the running board of an automobile so that it may be supported in an upright position along the outer edge of the running board and serve as a luggage retainer. When the frame or rack is not being used as a luggage retainer, it may be swung so as to lie flat upon the running board and foot-board and serve in the capacity of a mat or scraper. As will be hereinafter seen, the novelty in the invention resides in the manner in which the frame or rack is fastened to the foot-board of the automobile.

In further describing the invention, reference will be hereinafter made to the accompanying drawing, in which a preferred embodiment of the invention is illustrated. In these drawings:—

Figure 1 is a plan view of a device constructed in accordance with the invention fastened upon the foot-board of an automobile to serve as a mat or scraper for the same;

Figure 2 is a longitudinal sectional view taken on the plane indicated by the line 2—2 of Fig. 1;

Figure 3 is a front elevation, illustrating the device in upright position on the footboard when used as a luggage retainer;

Figure 4 is an enlarged plan view, partly broken away and in section, of one end of the device;

Figure 5 is an end view of the device in folded position;

Figure 6 is a transverse section taken on the plane indicated by the line 6—6 of Fig. 4; and Figure 7 is a similar view taken on the plane indicated by the line 7—7 of Fig. 3.

The most essential element in the combination of parts which constitute the invention, is a frame or rack 1. This is preferably of substantially rectangular shape and by preference is made of skeleton or open formation, comprising an angle iron side bar 2, to the ends of which are riveted or otherwise rigidly secured, the ends of a substantially U-shaped bar, the intermediate portion 3 of which serves as the other side of the frame or rack, while its arms 4 serve as the ends of the rack. The bars 2 and 3—4 shaped and connected as they are, form an open substantially rectangular-shaped frame. In this frame, there are transversely extending rods 5 and longitudinally extending bars 6. The rods 5 are secured to the bar 2 at one of their ends and to the bar 3 at their other ends, and support the longitudinal bars 6, although the ends of some of these bars 6 are riveted or otherwise rigidly secured to the arms 4 constituting the ends of the rectangular-shaped frame. Tubular members 5' are disposed upon the rods 5 between the bars 2, 3 and 5 to serve as spacing elements.

As shown in the drawings, the ends of one of the sides of the angle iron bar 2 are bent laterally to form ears 7. Pivoted at one of their ends to the ears 7 by means of suitable pivots 8 are angle iron bars 9. These bars 9 are adapted to rest upon the foot-board B of an automobile and extend transversely across the foot-board. One of the sides of the bars 9 rests flat upon the foot-board and is secured thereto by means of screws 10 or the like. The other sides of the bars 9 extend upwardly.

When the bars 9 are secured to the footboard in the manner shown in the drawings, the frame or rack 1 will be located so that when it is in upright position, it will extend along the outer edge of the footboard and act in the capacity of a luggage retainer. When not being used as a luggage retainer, the frame or rack may be swung downwardly, to lie flat upon the footboard and in such position, it will act in the capacity of a mat or scraper.

In order to support the frame or rack 1 in an upright position, braces 11 are employed. These braces are secured at their ends to the bars 9 and the ends of the frame or rack 1, and are connected at such points that when the frame or rack 1 is in an upright position, they will take a substantially diagonal or inclined position. By preference, one of the ends of the braces 11 are secured to the rear ends of the bars 9, while the other ends of the braces 11 are secured to the ends of the frame or rack 1 adjacent the side which is remote from the bar 2. The ends of the braces 11 are not rigidly secured to the bars 9 and the ends of the frame 1, but the connections are pivotal connections and the braces are made or composed of pivotally connected sections, so that they may be folded when the frame 1 is swung downwardly to lie flat upon the foot-board.

The bar 2 is slightly longer than the frame 1, so that the bars 9 will be slightly spaced from the ends of the frame when the frame is in lowered position. These spaces will be just sufficient to accommodate the folded sections of the braces 11, it being understood that the braces 11 are disposed between the inner sides of the bars 9 and the outer sides of the ends of the frame 1, and also that the sections of the braces will be disposed between the bars 9 and the ends of the frame 1 when the frame 1 is lowered to lie flat upon the running board B.

In order to frictionally hold the sections of the braces 11 in longitudinally alined or unfolded positions, these sections are provided with co-operating projections and depressions 12. One section of each brace is provided with a depression and the other section of the brace is provided with a projection to fit in the depressions when the two sections are brought into alinement. By this means, the braces will be effectively locked so as to support the frame 1 in upright position, but the joints may be easily broken to permit the braces to be swung downwardly.

If desired, the ends of the frame 1 may be provided with ears 13, which extend over the folded sections of the braces 11 to prevent the sections from swinging upwardly when the frame 1 is in a horizontal position flat against the running board.

From the foregoing description, taken in connection with the accompanying drawings, the construction, use and advantages of the invention will be readily understood. It is apparent that numerous changes may be made to the device without departing from the spirit and principle of the invention or sacrificing any of the advantages thereof, so that it is to be understood that changes may be made without departing from the meaning and scope of the appended claim.

I claim:

A combination foot-board mat and luggage carrier for automobiles comprising a pair of bars adapted to be secured transversely across the foot-board of an automobile, a substantially rectangular frame having the ends of one of its sides extended slightly beyond the ends of the frame and pivoted to one of the ends of said bars, said frame being adapted to extend either in an upright position and serve as a luggage retaining rack or to lie flat upon the foot-board and serve as a mat for the same, the ends of said frame being disposed in substantially parallel relation to said bars in its lowered position, braces secured at one of their ends to said bars and at their other ends to the ends of said frame to support said frame in its upright position, said braces consisting of pivotally connected sections which are foldable between said bars and the ends of the frame when the latter is swung down to lie flat upon the foot-board, and ears extending from the ends of said frame to lie over the sections of said braces when said frame is swung downwardly upon the foot-board to prevent the sections of said braces from swinging upwardly.

In testimony whereof I have hereunto affixed my signature.

GEORGE W. LEHMANN.